United States Patent
Frederiksen et al.

(10) Patent No.: US 9,624,810 B2
(45) Date of Patent: Apr. 18, 2017

(54) DELIVERY UNIT FOR A LIQUID ADDITIVE WITH A TEMPERATURE SENSOR, METHOD FOR CHECKING THE OPERATING STATE OF A DELIVERY UNIT AND MOTOR VEHICLE HAVING A DELIVERY UNIT

(71) Applicant: EMITEC GESELLSCHAFT FUER EMISSIONSTECHNOLOGIE MBH, Lohmar (DE)

(72) Inventors: Finn Frederiksen, Hals (DK); Georges Maguin, Marly (FR); Cheikh Diouf, Silly-sur Nied (FR); Sven Schepers, Troisdorf (DE); Jan Hodgson, Troisdorf (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 14/499,416

(22) Filed: Sep. 29, 2014

(65) Prior Publication Data
US 2015/0013315 A1    Jan. 15, 2015

Related U.S. Application Data

(63) Continuation of application No. PCT/EP2013/056457, filed on Mar. 27, 2013.

(30) Foreign Application Priority Data

Mar. 28, 2012  (DE) .................. 10 2012 006 249

(51) Int. Cl.
  *F01N 11/00* (2006.01)
  *F01N 3/20* (2006.01)
  (Continued)

(52) U.S. Cl.
  CPC ............ *F01N 11/002* (2013.01); *F01N 3/206* (2013.01); *F01N 3/2006* (2013.01);
  (Continued)

(58) Field of Classification Search
  CPC ................. F01N 11/002; F01N 13/008; F01N 2610/1406; F01N 2610/148; G01J 5/0022; G01K 13/02
  See application file for complete search history.

(56) References Cited

U.S. PATENT DOCUMENTS 6,453,865 B2   9/2002   Hirose et al.
8,454,297 B2   6/2013   Congiu et al.
(Continued)

FOREIGN PATENT DOCUMENTS

DE   4223116 A1   11/1993
DE   10356929 A1   6/2005
(Continued)

*Primary Examiner* — Jonathan Matthias
(74) *Attorney, Agent, or Firm* — Laurence A. Greenberg; Werner H. Stemer; Ralph E. Locher

(57) ABSTRACT

A delivery unit for delivering a liquid additive in a motor vehicle, includes at least one temperature sensor for contactlessly measuring a temperature at least at one measurement point in the delivery unit. The temperature sensor and the measurement point have a spacing therebetween and a radiation channel which is free from fixtures is provided between the temperature sensor and the measurement point. A method for checking the operating state of a delivery unit and a motor vehicle having a delivery unit are also provided.

10 Claims, 2 Drawing Sheets

(51) Int. Cl.
*G01J 5/00* (2006.01)
*G01K 13/02* (2006.01)

(52) U.S. Cl.
CPC .......... *F01N 3/2066* (2013.01); *G01J 5/0022* (2013.01); *G01K 13/02* (2013.01); *F01N 2610/02* (2013.01); *F01N 2610/10* (2013.01); *F01N 2610/1406* (2013.01); *F01N 2610/148* (2013.01); *F01N 2610/1486* (2013.01); *G01K 2013/026* (2013.01); *Y02T 10/24* (2013.01)

(56) References Cited

U.S. PATENT DOCUMENTS

| | | |
|---|---|---|
| 9,127,583 B2 | 9/2015 | Hodgson et al. |
| 2008/0107150 A1 | 5/2008 | Brummel et al. |
| 2009/0093983 A1* | 4/2009 | Trafford .............. G01F 23/2962 702/100 |
| 2010/0107615 A1* | 5/2010 | Chmielewski ........ F01N 3/2066 60/303 |
| 2010/0199641 A1 | 8/2010 | Sague et al. |
| 2013/0263938 A1* | 10/2013 | Harr ...................... F01N 3/2066 137/334 |
| 2014/0219314 A1 | 8/2014 | Ryou |

FOREIGN PATENT DOCUMENTS

| | | | |
|---|---|---|---|
| DE | 102005044340 A1 | 6/2006 | |
| DE | 102010004614 A1 | 7/2011 | |
| DE | 102010020200 A1 | 11/2011 | |
| DE | 102010024554 A1 * | 12/2011 | .......... F01N 3/2056 |
| EP | 1132245 A2 | 9/2001 | |
| JP | 2002295245 A | 10/2002 | |
| KR | 101114551 B1 | 2/2012 | |
| RU | 2010107674 A | 9/2011 | |
| WO | 2004013474 A1 | 2/2004 | |
| WO | 2009056489 A2 | 5/2009 | |
| WO | 2011141502 A1 | 11/2011 | |

* cited by examiner

DELIVERY UNIT FOR A LIQUID ADDITIVE WITH A TEMPERATURE SENSOR, METHOD FOR CHECKING THE OPERATING STATE OF A DELIVERY UNIT AND MOTOR VEHICLE HAVING A DELIVERY UNIT

CROSS-REFERENCE TO RELATED APPLICATION

This is a continuation, under 35 U.S.C. §120, of copending International Application No. PCT/EP2013/056457, filed Mar. 27, 2013, which designated the United States; this application also claims the priority, under 35 U.S.C. §119, of German Patent Application DE 10 2012 006 249.4, filed Mar. 28, 2012; the prior applications are herewith incorporated by reference in their entirety.

BACKGROUND OF THE INVENTION

Field of the Invention

The invention relates to a delivery unit for delivering a liquid additive in a motor vehicle, in which the delivery unit has a temperature sensor. Such a delivery unit is, for example, suitable for delivering liquid reducing agent into an exhaust-gas treatment device of an internal combustion engine. The invention also relates to a method for checking the operating state of a delivery unit and a motor vehicle having a delivery unit.

In the automotive field in particular, in order to purify the exhaust gases of internal combustion engines, exhaust-gas treatment devices are widely used into which a liquid additive is supplied for the conversion of certain pollutant constituents in the exhaust gas. A reducing agent is particularly frequently used as a liquid additive which can reduce nitrogen oxide compounds in the exhaust gas in an effective manner. In exhaust-gas aftertreatment devices of that type, the method of selective catalytic reduction (SCR) is implemented. A urea-water solution, which can be converted into ammonia within the exhaust gas in the exhaust-gas treatment device or outside the exhaust gas in a reactor provided especially for that purpose, is generally used as a reducing agent. In the case of the conversion within the exhaust gas, a hydrolysis catalytic converter which catalyses the conversion of urea into ammonia, is often disposed in the exhaust-gas treatment device. Nitrogen oxide compounds in the exhaust gas react with the ammonia to form non-harmful nitrogen, water and carbon dioxide. In order to assist that reaction, a catalytic converter (an SCR catalytic converter) is generally also provided in the exhaust-gas treatment device.

A urea-water solution, which is used as an additive for exhaust-gas purification in motor vehicles is available, for example, under the trademark AdBlue®. AdBlue® is a urea-water solution with a urea fraction of 32.5 percent.

In order to deliver liquid additive into the exhaust-gas treatment device of a motor vehicle, a delivery unit is generally required which is used to pump the additive out of a tank and supply it to the exhaust-gas treatment device.

Various aspects must be considered in the construction of such delivery units. One important aspect is that commonly used liquid additives (for example including the reducing agent described) can freeze. The 32.5 percent urea-water solution AdBlue®, for example, freezes at −11° C. In the case of motor vehicles, such low temperatures may arise, in particular, during long standstill periods in winter. Furthermore, it must be considered that the viscosity of liquid additives may vary with the temperature of the additive. Additionally, it must be considered that the energy required for evaporating a liquid additive varies depending on how high the outlet temperature of the liquid additive is in the delivery unit.

Furthermore, a delivery unit for delivering a liquid additive into an exhaust-gas treatment device of a motor vehicle should be as inexpensive as possible and have as precisely settable a delivery rate as possible. In a motor vehicle, such a delivery unit constitutes an additional delivery system in addition to the fuel supply, and should therefore entail as little additional costs as possible. An overdosing and/or underdosing of liquid additive into the exhaust-gas treatment device can be avoided by using a precisely settable delivery rate.

SUMMARY OF THE INVENTION

It is accordingly an object of the invention to provide a delivery unit for a liquid additive with a temperature sensor, a method for checking the operating state of a delivery unit and a motor vehicle having a delivery unit, which overcome the hereinafore-mentioned disadvantages and solve or at least alleviate the highlighted technical problems of the heretofore-known units, methods and vehicles of this general type.

With the foregoing and other objects in view there is provided, in accordance with the invention, a delivery unit for delivering a liquid additive in a motor vehicle, comprising at least one temperature sensor used to measure a temperature in a contactless manner at least at one measurement point in the delivery unit, the temperature sensor and the measurement point being spaced apart from one another, and a radiation channel being free from fixtures and provided between the temperature sensor and the measurement point.

In this case, a delivery unit means, in particular, a device which, at a suction point, can extract or suck liquid additive out of a tank for storing the liquid additive, and which discharges the liquid additive at a discharge point. The delivery unit is preferably also constructed to build up a delivery pressure at the discharge point or in the line system downstream thereof. The delivery unit can be operated in such a way that the delivery pressure of the liquid additive at the discharge point always attains a certain pressure independently of how much liquid additive is demanded or discharged at the discharge point. The pump of the delivery unit may then be referred to as a "pressure-increasing pump." It is also possible for the delivery unit to be constructed to discharge precisely a certain predefined quantity of liquid additive at the discharge point. The pump of the delivery unit is then preferably a "dosing pump" which, as it delivers, simultaneously performs a dosing action.

The motor vehicle may, for example, be a passenger motor vehicle, a truck, a ship or a rail vehicle.

The liquid additive is preferably a reducing agent for exhaust-gas purification, and particularly preferably urea-water solution.

A temperature sensor which can measure a temperature at a measurement point in a contactless manner (contactless temperature sensor) is, in particular, not in material contact with the measurement point at which the temperature measurement is carried out.

The measurement point is preferably formed by a surface or an outer surface of a component of the delivery unit. The measurement point is preferably composed of a material which can emit and/or reflect radiation including information regarding the temperature at the measurement point.

Information regarding the temperature at the measurement point is transported from the measurement point to the temperature sensor by non-material transmission. In particular, there is no exchange of heat between the measurement point and the temperature sensor by thermal conduction and/or by convection, which is of significance for the measurement of the temperature by using the temperature sensor.

With regard to the transmission of the information regarding the temperature by radiation, there are two different possible concepts for the temperature sensor which may be used in the described delivery unit. In the first concept, the temperature sensor measures the radiation which is emitted passively from the measurement point, and determines the temperature from the radiation. Such radiation is, for example, the heat radiation emitted by any body due to its temperature. The wavelength of the radiation is dependent on the temperature. It is therefore possible for the temperature sensor to determine the temperature at the measurement point on the basis of the wavelength of the radiation. In the second concept, the temperature sensor emits radiation which is reflected by the measurement point and strikes the temperature sensor again. At the measurement point, the radiation emitted by the temperature sensor is modified in such a way that the temperature measurement takes place on the basis of the reflected beam which strikes the sensor again. For this sensor concept, the modification of the radiation at the measurement point has a temperature dependency. For example, the wavelength of the radiation can be changed at the measurement point, wherein the change differs depending on what the temperature is at the measurement point. It is also possible for the radiation to be reflected at the measurement point at an angle which is temperature-dependent. Depending on the temperature of the measurement point, the radiation can then strike the temperature sensor again at a different point, and in this way the temperature sensor can identify the temperature at the measurement point.

In order to ensure that the transmission of the information between the measurement point and the temperature sensor is possible, the radiation channel is provided between the measurement point and the temperature sensor.

The radiation channel is free from fixtures. This means in particular that, between the temperature sensor and the measurement point, no material is provided which prevents the transport of the information regarding the temperature (in particular the radiation) between the measurement point and the temperature sensor. It is possible for the intermediate space between the temperature sensor and the measurement point to be filled with air or some other gas. The air or the gas is then permeable to the information regarding the temperature (or the radiation).

The air or the gas preferably furthermore does not perform any (considerable, appreciable) heat transport function in the sense of heat conduction or convection from the measurement point to the temperature sensor, through which the information regarding the temperature at the measurement point passes to the temperature sensor.

The radiation channel being free from fixtures means, in particular, that no impermeable fixtures are disposed between the measurement point and the temperature sensor. Permeable components or permeable fixtures may be disposed in the radiation channel. The permeable components or permeable fixtures however do not block the radiation channel. Such components may, for example, be produced from special filter foils and provided for protecting the temperature sensor.

The radiation channel is preferably rectilinear. This means, in particular, that the radiation channel has no bends or curves, but rather forms a rectilinear connection which is free from fixtures, from the measurement point to the temperature sensor.

In special embodiments of the delivery unit, it is possible for the radiation channel to have bends. Measures for deflecting the information regarding the temperature (or the radiation) are then preferably provided. For example, in the region in which the radiation must bend, there may be disposed a type of mirror through the use of which the information regarding the temperature (or the radiation) is deflected.

The described problems, such as the risk of freezing of liquid additive, the temperature influence on the viscosity of liquid additive, and/or the temperature dependency of the energy quantity required for evaporating liquid additive, can be at least partially solved by using a temperature sensor in the delivery unit.

Through the use of a temperature sensor in the delivery unit, it is also possible to improve the delivery accuracy of a delivery unit. The temperature of the delivery unit may have a cross-influence on the amount of liquid additive delivered by the delivery unit and on the delivery rate of the delivery unit. For example, an increased temperature can cause the power losses of a delivery unit to rise, as a result of which the delivery rate is reduced. It may also be the case that the viscosity of the liquid additive falls with increasing temperature. In this way, the energy expenditure for delivery is reduced, and the delivery rate of the delivery unit rises with increasing temperature. The temperature may have other influences on the delivery rate (and, in particular, also on the accuracy of the delivery rate).

The temperature of the delivery unit can be determined by using a temperature sensor. With the knowledge of the temperature, the described cross-influences can be at least partially taken into consideration, and the delivery accuracy can be improved.

Through the use of a temperature sensor, the heating of the delivery unit (or else of certain components of the delivery unit, such as, for example, a pump) can be monitored, in order to initiate measures for lowering the temperature of the components if appropriate. For example, if the temperature of a component exceeds a critical temperature, the delivery unit may even be deactivated in order to prevent damage to the component. It is also possible for the delivery rate of the delivery unit to merely be reduced in order to lower the temperature of the delivery unit or of the component.

With the described contactless temperature sensor, monitoring of the temperature of components of the delivery unit can be realized in a particularly simple and inexpensive manner. There is no need for direct contact between the temperature sensor and the component being monitored. It is thereby possible, in particular, to dispense with electrical lines to the temperature sensor on the monitored component.

In accordance with another particularly advantageous feature of the delivery unit of the invention, the temperature sensor is an infrared sensor.

An infrared sensor can identify infrared radiation. An infrared sensor as a temperature sensor is preferably constructed so as to receive infrared radiation from the measurement point. The infrared radiation emitted from the measurement point includes information regarding the temperature of the infrared point. The frequency of infrared radiation emitted by a body is dependent on the temperature of the measurement point. In this way, information regarding a temperature of the measurement point can be gained on the basis of the infrared radiation. An infrared sensor of this type enables a particularly advantageous embodiment of the described delivery unit with a contactless temperature sensor.

In accordance with a further advantageous feature of the delivery unit of the invention, the measurement point and the temperature sensor are disposed at a spacing of at least 2 cm [centimeters] from one another. The spacing may preferably also be more than 3 cm or particularly preferably even more than 5 cm. The spacing is preferably not greater than 20 cm.

In this way, it is possible from one position in the delivery unit to measure a temperature at a remote position (the measurement point) in the delivery unit. The temperature may thus be disposed, for example, in the vicinity of the further electronic components of the delivery unit, whereas the measurement point is situated on a component of the delivery unit which delivers liquid additive. The temperature measurement at the measurement point can thus be utilized to gain information regarding the temperature of the liquid additive in the delivery unit. Connecting lines between the temperature sensor and further electronic components can thus be dispensed with. The outlay for the assembly of the delivery unit is also reduced considerably. Mounting a connecting line from a temperature sensor on a component of the delivery unit to a further electronic component (for example a control unit) is generally cumbersome and can be avoided by using the described delivery unit with a contactless temperature sensor.

In accordance with an added advantageous feature of the delivery unit of the invention, a plurality of temperature sensors with which temperatures can be measured at different measurement points in the delivery unit, are disposed on a common sensor support.

The temperature sensors are preferably disposed on a common structure. It is, for example, possible for a plurality of temperature sensors to be mounted on a common (printed) circuit board. Each of the temperature sensors is then constructed to measure a temperature at an associated measurement point. One radiation channel which is free from fixtures and through which the temperature at the measurement point can be measured, is preferably provided from each individual temperature sensor to each respective individual measurement point. The individual measurement points are preferably spaced apart from one another, in such a way that the radiation channels may extend in different directions proceeding from the sensor support.

Such a configuration makes it possible for the temperature sensors to be disposed very close to one another, in such a way that the information from the temperature sensors can be processed very easily by further electronic components in order to monitor the temperature at very different locations in the delivery unit simultaneously in a simple manner.

In accordance with an additional advantageous feature of the delivery unit of the invention, temperatures at different measurement points can be monitored by using one temperature sensor.

It is preferable for the different measurement points to be spaced apart from one another, and for one radiation channel which is free from fixtures to exist in each case between the (single) temperature sensor and the different measurement points. The temperature sensor is preferably constructed in such a way that it can be switched between the different measurement points, so that it receives information regarding the temperature (or, in particular, radiation) from different measurement points at different times. For example, the temperature sensor may have a cover which only opens up one radiation channel to one certain measurement point in each case, and which for example can be moved or deformed in order to cover some of the existing radiation channels to some of the measurement points provided in each case, and to open up a particular radiation channel to a particular measurement point. It is also possible for a movable temperature sensor to be used which is directed alternately to the different measurement points and which thus determines alternately the temperatures prevailing at each of the measurement points.

In this way, the temperature at different measurement points in the delivery unit can be monitored by using only one temperature sensor.

In accordance with yet another advantageous feature of the delivery unit of the invention, the delivery unit has at least one heating apparatus for heating additive which is present in the delivery unit.

A heating apparatus may, for example, be a line through which a liquid for heating the delivery unit flows. The liquid may, for example, be the coolant of an internal combustion engine. The heating apparatus may also be an electrical heating apparatus which has, for example, a PTC heating element.

It is particularly advantageous for the delivery unit to have a heating apparatus because, in particular in the case of delivery units with a heating apparatus, monitoring of the temperature of the delivery unit is necessary in order to monitor the result of the operation of the heating apparatus.

In accordance with yet a further advantageous feature of the delivery unit of the invention, the delivery unit has a pump for delivering the additive and at least one measurement point is disposed on an outer surface of the pump.

A pump may, for example, be an electrically driven pump which has a rotary drive or a linear drive. In the case of a pump with a linear drive, an electric drive typically acts directly on a pump piston, which executes a delivery movement in such a way that the pump delivers the liquid additive. In the case of a pump with a rotary drive, a mechanical transmission element such as a connecting rod is typically provided which converts the rotational movement of the pump drive into a linear movement of the pump piston or of a pump diaphragm. The pump piston or the pump diaphragm then performs a delivery movement which leads to the delivery of the additive.

A pump normally exhibits power losses. Not all of the electrical energy imparted for driving the pump is actually also absorbed and/or transferred to the liquid additive in the form of a pressure increase and volume delivery of the liquid additive (in the form of the delivery rate). The energy which is not transferred constitutes a power loss, and typically leads to heating of the pump. In this way, a significant increase in the temperature of the pump can arise, in particular, in the case of pumps with a linear drive. Such an increase in the temperature can be monitored in a contactless manner by using the temperature sensor of the delivery unit if a measurement point is disposed on an outer surface of the pump. In this way, an undesired temperature increase or damage to the pump as a result of the temperature increase can be avoided because suitable countermeasures for reducing the temperature of the pump can be implemented in good time. Such countermeasures may include, for example, a partial shut-down of the pump, a reduction in the delivery rate of the pump or even a complete shut-down of the pump.

In pumps with a linear drive, power losses are particularly high. On the other hand, pumps with a linear drive are particularly inexpensive, and are therefore often used for delivery units for liquid additive. The particularly inexpensive construction described herein for a delivery unit with a temperature sensor for monitoring the temperature of the pump is therefore particularly advantageous in the case of a delivery unit with a pump with a linear drive.

A further component of a delivery unit having a temperature which can be monitored by using a contactless temperature sensor may, for example, be a portion of a delivery duct for the liquid additive. The measurement point may then be disposed on an outer surface of a line which forms the delivery duct. The temperature sensor may then be used, in particular, also for measuring the temperature of the liquid additive in the portion of the delivery duct. This functions particularly well if the line which forms the delivery duct in the portion has a thin-walled construction with high thermal conductivity, and the temperature of the liquid additive is transferred quickly to the outside (or the measurement point) through the thin-walled line.

Further components having a temperature which can be monitored by using a contactless temperature sensor are, for example, valves, electronic components and/or the housing of the delivery unit. The measurement point is then preferably disposed in each case on the surface of the respective component.

A contactless temperature sensor for monitoring the temperature of the housing is particularly advantageous if the delivery unit is disposed in a tank for the liquid additive. It is then possible to utilize the temperature of the housing to determine a temperature of the liquid additive in the tank. For this purpose, it is particularly advantageous if the housing has a thin construction with particularly high thermal conductivity in the region of the measurement point, in order to ensure that the temperature of the liquid additive is transferred particularly effectively to the measurement point.

In accordance with yet an added advantageous feature of the delivery unit of the invention, the delivery unit has a panel for fastening electronic components, wherein the temperature sensor is fastened to the panel. The panel may, for example, be an electronic printed circuit board on which, aside from the temperature sensor, there are also disposed further electronic components such as, for example, processors of a control unit and/or memory chips of a control unit. The panel with electronic components and the temperature sensor may be installed in a housing of the delivery unit as one component during the assembly of the delivery unit. Special application of a temperature sensor for measuring a temperature in the delivery unit is then no longer necessary. If appropriate, it is necessary merely for the described radiation channel from the panel or from the temperature sensor disposed on the panel to the desired measurement point to be free from fixtures. This is realized by using one-time construction measures implemented during the construction of the delivery unit, and requires no special assembly steps during the assembly of the delivery unit. This permits particularly simple and inexpensive assembly of the delivery unit.

With the foregoing and other objects in view there is provided, in accordance with the invention, a method for checking the operating state of a delivery unit for delivering a liquid additive, which comprises carrying out a contactless temperature measurement at least at one measurement point in the delivery unit, and inferring the temperature of the additive in a delivery duct of the delivery unit from the temperature measured at the measurement point.

The method is suitable, in particular, for being carried out with a delivery unit as described herein. The contactless temperature measurement takes place preferably by using a suitable temperature sensor through a radiation channel which is free from fixtures. The described further features of the delivery unit may be transferred to the method. The method makes it possible to determine the temperature of the liquid additive in the delivery unit using a particularly simple and inexpensive temperature sensor. The determination of the temperature of the liquid additive from the temperature measured at the measurement point is preferably carried out by using a calculation within an electronic component or within an electronic component of a control unit of the delivery unit.

The advantages and special embodiment features of the method may be transferred to the delivery unit.

With the objects of the invention in view, there is concomitantly provided a motor vehicle, comprising an internal combustion engine, an exhaust-gas treatment device for purifying the exhaust gases of the internal combustion engine, and a delivery unit for delivering a liquid additive into the exhaust-gas treatment device. The motor vehicle preferably has a tank in which the liquid additive is stored and from which the delivery unit can extract the liquid additive. Also preferably provided is a feed device with which the liquid additive delivered by the delivery unit can be fed to the exhaust-gas treatment device. The additive is preferably a reducing agent with which the SCR process can be implemented in the exhaust-gas treatment device. The tank, the delivery unit and the feed device are preferably connected to one another through a line for the liquid additive.

The delivery unit of the motor vehicle is preferably also suitable for carrying out the described method.

Other features which are considered as characteristic for the invention are set forth in the appended claims, noting that the features specified individually in the claims may be combined with one another in any desired technologically meaningful way and may be supplemented by explanatory facts from the description, with further structural variants of the invention being specified.

Although the invention is illustrated and described herein as embodied in a delivery unit for a liquid additive with a temperature sensor, a method for checking the operating state of a delivery unit and a motor vehicle having a delivery unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
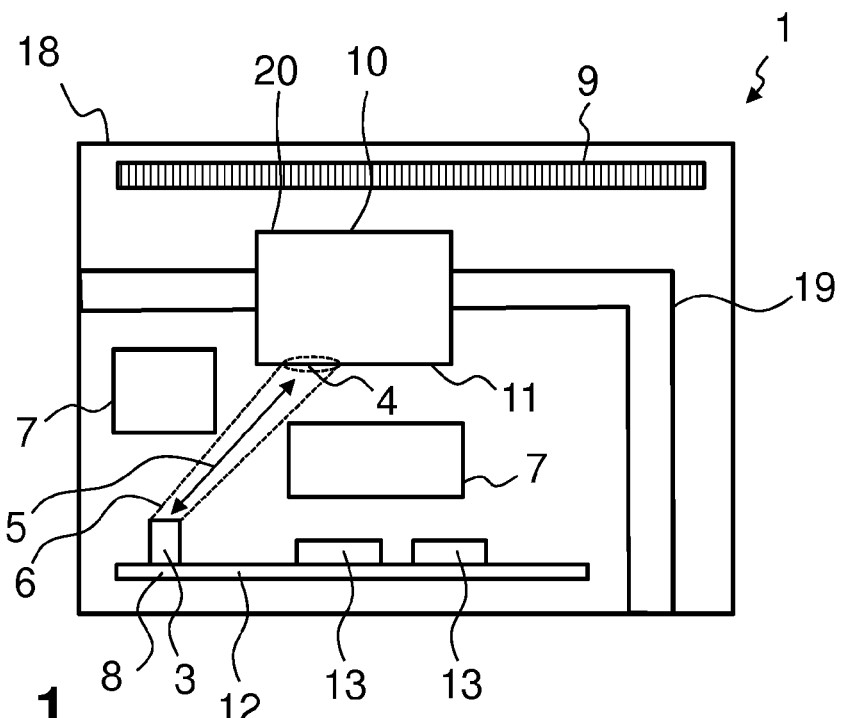
FIG. 1 is a block diagram of a first structural variant of a delivery unit.
Figure 2:
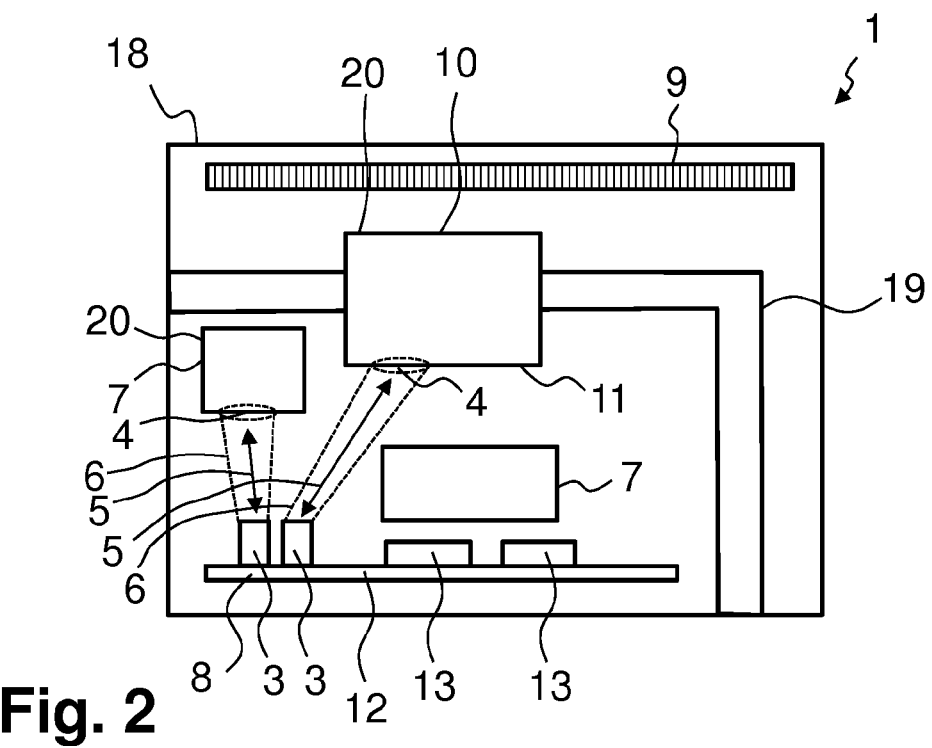
FIG. 2 is a block diagram of a second structural variant of a delivery unit.

Referring now in detail to the figures of the drawings, which show particularly preferred exemplary embodiments, to which the invention is not restricted and in which proportions are merely schematic, and first, particularly, to FIGS. 1 and 2 thereof, there are seen two different structural variants of a delivery unit 1. The delivery unit 1 has, in each case, a housing 18 through which a delivery duct 19 runs for delivering a liquid additive. The delivery duct 19 preferably runs in each case from a non-illustrated suction point for the extraction or suction of liquid additive out of a tank, to a discharge point at which the liquid additive is provided. The liquid additive is preferably reducing agent or urea-water solution. In each case, the delivery duct 19 illustrated in FIG. 1 and FIG. 2 can be extended, proceeding from the illustration in the figures, to the suction point and to the discharge point by line portions. The line portions need not be a constituent part of the delivery unit 1 but may rather be formed, for example, by hoses. A pump 10, which is preferably provided in the delivery duct 19, is used to pump the liquid additive through the delivery duct 19. The delivery unit 1 preferably also has a heating apparatus or heater 9. The delivery unit 1 preferably additionally has a sensor support 8 which is, for example, a constituent part of a panel 12 on which further electronic components 13 of the delivery unit 1 are also mounted. According to FIG. 1, a temperature sensor 3 is disposed on the sensor support 8. A radiation channel 6 leads from the temperature sensor 3 to a measurement point 4 on a component 20 of the delivery unit 1. The temperature sensor 3 and the measurement point 4 are spaced apart or separated by a spacing 5. Radiation can pass from the measurement point 4 to the temperature sensor 3 through the radiation channel 6. The temperature sensor 3 can determine the temperature at the measurement point 4 by using the radiation. The radiation channel 6 is free from fixtures 7, so that a path for the radiation from the measurement point 4 to the temperature sensor 3 is free.

In FIG. 1, the pump 10 is illustrated as the component 20, and the measurement point 4 is situated on an outer surface 11 of the pump 10.

FIG. 2 shows a structural variant in which two temperature sensors 3 are disposed on the sensor support 8. The temperature sensors each have a separate radiation channel 6 through which radiation can pass in each case from a separate measurement point 4 to the respective temperature sensor 3. One temperature sensor 3 could also monitor the different measurement points 4 through the different radiation channels 6 as well. In this case, too, the radiation channels 6 are free from fixtures 7. In this case, too, the measurement points 4 are situated on components 20 of the delivery unit 1. By way of example, it is also the case in FIG. 2 that the pump 10 of the delivery unit is illustrated as a component 20, and the measurement point 4 is disposed on the outer surface 11 of the pump 10. A further component 20 may, for example, be a valve.

Figure 3:
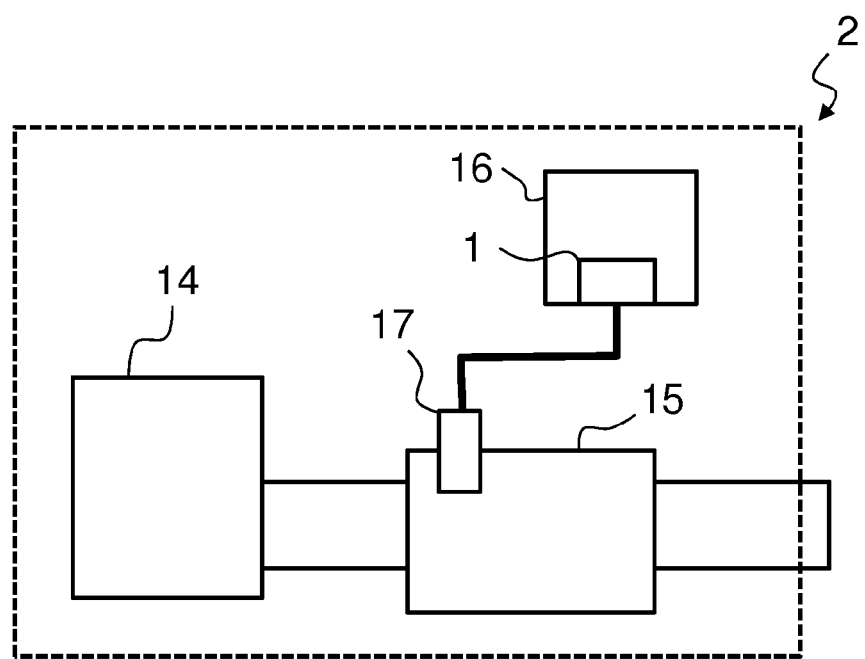
FIG. 3 is a block diagram of a motor vehicle having a delivery unit as described.

FIG. 3 shows a motor vehicle 2 having an internal combustion engine 14 and an exhaust-gas treatment device 15 for the purification of the exhaust gases of the internal combustion engine 14. Disposed on the exhaust-gas treatment device 15 is a feed device 17 which receives liquid additive from a delivery unit 1 which is disposed on a tank 16 for the liquid additive.

The invention claimed is:

1. A delivery unit for delivering a liquid additive in a motor vehicle, the delivery unit comprising:

at least one measurement point in the delivery unit;
at least one temperature sensor configured to contactlessly measure a temperature at said at least one measurement point;
said at least one temperature sensor and said at least one measurement point being separated from each other by a spacing;
a pump configured to deliver the additive, said pump having an outer surface on which said at least one measurement point is disposed; and
a radiation channel disposed between said at least one temperature sensor and said at least one measurement point and being free of fixtures.

2. The delivery unit according to claim 1, wherein said at least one temperature sensor is an infra-red sensor.

3. The delivery unit according to claim 1, wherein said spacing between said at least one measurement point and said at least one temperature sensor is at least 2 cm [centimeters].

4. The delivery unit according to claim 1, which further comprises:

a sensor support;
said at least one measurement point including different measurement points in the delivery unit; and
said at least one temperature sensor including a plurality of temperature sensors disposed in common on said sensor support and configured to measure temperatures at said different measurement points.

5. The delivery unit according to claim 1, wherein:

said at least one measurement point includes different measurement points spaced apart from one another in the delivery unit;
said at least one temperature sensor is one temperature sensor; and
radiation channels being free of fixtures are each disposed between said one temperature sensor and a respective one of said different measurement points permitting temperatures at said different measurement points to be monitored by said one temperature sensor.

6. The delivery unit according to claim 1, which further comprises at least one heater configured to heat additive present in the delivery unit.

7. The delivery unit according to claim 1, which further comprises a panel for fastening electronic components, said at least one temperature sensor being fastened to said panel.

8. A motor vehicle, comprising:

an internal combustion engine;
an exhaust-gas treatment device configured to purify exhaust gases of said internal combustion engine; and
a delivery unit according to claim 1 configured to deliver a liquid additive into said exhaust-gas treatment device.

9. A delivery unit for delivering a liquid additive in a motor vehicle, the delivery unit comprising:

a delivery unit housing having a pump disposed therein;
at least one measurement point in the delivery unit housing;
at least one temperature sensor configured to contactlessly measure a temperature at said at least one measurement point;
said at least one temperature sensor and said at least one measurement point being separated from each other by a spacing; and
a radiation channel disposed between said at least one temperature sensor and said at least one measurement point and being free of fixtures.

10. The delivery unit according to claim 9, which further comprises at least one heater configured to heat additive present in the delivery unit, said at least one heater being disposed inside said housing.

* * * * *